United States Patent [19]
Stanforth et al.

[11] Patent Number: 5,202,033
[45] Date of Patent: Apr. 13, 1993

[54] IN SITU METHOD FOR DECREASING HEAVY METAL LEACHING FROM SOIL OR WASTE

[75] Inventors: Robert R. Stanforth; Ajit K. Chowdhury, both of Madison, Wis.

[73] Assignee: RMT, Inc., Madison, Wis.

[21] Appl. No.: 767,520

[22] Filed: Sep. 30, 1991

[51] Int. Cl.$^5$ .......................... C02E 11/14; B09B 3/00
[52] U.S. Cl. ................................. 210/747; 210/751; 210/912; 210/911; 405/128; 405/129; 405/263; 588/236; 588/256
[58] Field of Search ............... 210/747, 751, 912, 911; 405/128, 129, 263; 588/231, 236, 253, 256; 423/34, 35, 42, 55, 57, 87, DIG. 20

[56] References Cited

U.S. PATENT DOCUMENTS

| | | | |
|---|---|---|---|
| 3,094,846 | 6/1963 | Peeler, Jr. | 210/747 |
| 3,962,080 | 6/1976 | Dulin et al. | 210/59 |
| 4,268,188 | 5/1981 | Bertus et al. | 405/128 |
| 4,354,942 | 10/1982 | Kalzur et al. | 210/747 |
| 4,547,290 | 10/1985 | Pichat | 210/751 |
| 4,582,611 | 4/1986 | Wang | 210/747 |
| 4,671,882 | 6/1987 | Douglas et al. | 210/720 |
| 4,687,373 | 8/1987 | Falk et al. | 405/128 |
| 4,737,356 | 5/1988 | O'Hara et al. | 423/659 |
| 4,761,182 | 8/1988 | Whitescarver et al. | 106/98 |
| 4,781,841 | 11/1988 | Sameya | 210/747 |
| 4,861,482 | 8/1989 | Frankenberger, Jr. et al. | 210/747 |
| 4,878,944 | 11/1989 | Rolle et al. | 75/25 |
| 4,889,640 | 12/1989 | Stanforth | 210/751 |
| 4,927,293 | 5/1990 | Campbell | 405/128 |
| 4,948,516 | 8/1990 | Fisher et al. | 210/751 |
| 4,950,409 | 8/1990 | Stanforth | 210/751 |
| 4,981,393 | 1/1991 | van de Velde et al. | 405/128 |
| 4,988,376 | 1/1991 | Mason et al. | 65/134 |
| 5,013,185 | 5/1991 | Taki | 405/128 |
| 5,024,556 | 6/1991 | Timmerman | 405/128 |
| 5,028,272 | 7/1991 | Bonee | 106/792 |
| 5,037,240 | 8/1991 | Sherman | 405/128 |
| 5,037,479 | 8/1991 | Stanforth | 106/691 |
| 5,061,119 | 10/1991 | Balthaus et al. | 210/747 |

OTHER PUBLICATIONS

Nagle, D. L., R. R. Stanforth, P. E. Duranceau and T. P. Kunes, 1983, "AFS Transactions, Treatment of Hazardous Foundry Melting Furnace Dust and Sludges," vol. 91, pp. 715-720.

Turpin, P. D., T. R. Stalzenburg, W. A. Stephens, and T. P. Kunes, 1985, "AFS Transactions, Methods to Treat EP Toxic Foundry Wastes and Waste Waters," vol. 93, pp. 737-740.

Primary Examiner—Stanley S. Silverman
Assistant Examiner—Neil M. McCarthy
Attorney, Agent, or Firm—Lathrop & Clark

[57] ABSTRACT

A method of treating solid waste in soil or solid disposed waste containing unacceptable levels of leachable metals, such as lead, cadmium, arsenic, zinc, copper and chromium, includes mixing the solid waste or soil in place with a phosphate source or a carbonate source or ferrous sulfate. After the solid waste and the additive are mixed, if needed an additional pH controlling agent is mixed into the soil or waste and additive. After the solid waste and additive and pH controlling agent are mixed under conditions which support reaction between the additive, pH controlling agent and metals, the metals will be converted to non-leachable forms which are relatively stable under normal environmental conditions. The treatment additives can be introduced and contacted with the soil or waste in any of the following techniques: spreading the additives on top of the soil or waste and mixing with a mechanical device, such as a rotary tiller, adding the treatment chemical through an infiltration gallery as a solution or slurry, injecting a soluble additive through injection nozzles or injection wells, and adding a treatment additive through a hollow-shaft auger and in-place mechanical mixing.

13 Claims, 1 Drawing Sheet

IN SITU METHOD FOR DECREASING HEAVY METAL LEACHING FROM SOIL OR WASTE

FIELD OF THE INVENTION

This invention relates to the treatment of contaminated waste or soils in general, and particularly to the in-place chemical treatment of wastes or soils containing high levels of heavy metals such as lead, zinc, arsenic, chromium, copper, and cadmium to control leaching of these heavy metals such that they will not leach at unacceptable levels into the ground water under naturally occurring conditions.

BACKGROUND OF THE INVENTION

As the potential dangers of hazardous wastes in the environment have become better appreciated, regulatory and community pressure have made it necessary to return to sites of waste disposal or toxic contamination to reassess the possible hazardousness of wastes or contaminants disposed there and to take steps to reduce or eliminate dangers to people directly or to the surrounding environment in general and to ground water in particular.

Heavy metals such as lead, arsenic, cadmium, chromium, zinc and copper are common elements of concern in waste sites under investigation, with lead being the most commonly found. Leaching of heavy metals into ground water is of particular concern because of the danger that drinking water supplies would thus become contaminated. The U.S. EPA has designated maximum contaminant levels (MCL's) and secondary maximum contaminant levels (SMCL's) for heavy metals in the National Drinking Water Regulations presented in 40 CFR §141.11 and §143.3 (1990).

Solid wastes are classified as hazardous by the United States Environmental Protection Agency (U.S. EPA) for a number of reasons. Certain wastes are classified as hazardous because they contain chemicals which are listed by U.S. EPA as hazardous. Other wastes are classified as hazardous because of characteristics of the waste. These characteristics include ignitability, corrosivity, reactivity, and toxicity.

The characteristic of toxicity is determined using the Toxicity Characteristic Leaching Procedure Test (TCLP). The TCLP Test determines whether a solid waste has unacceptable levels of hazardous substances, such as heavy metals, which can be leached from the waste by infiltrating leachate. Wastes containing leachable lead and cadmium are currently classified as TCLP Toxic Waste if the level of cadmium extracted in a TCLP Toxicity test is above 1.0 mg/L or if the level of lead extracted is above 5.0 mg/L. Some states, notably Michigan, also classify wastes which leach high levels of copper and zinc as hazardous.

The TCLP Test is designed to simulate a worst-case leaching situation. These leaching conditions would typically be found in the interior of an actively degrading municipal landfill. In such landfills, the leaching medium is slightly acidic, with a pH of about 5. Additionally, the leaching medium is heavily buffered by volatile organic acids (e.g., acetic acid) produced by the facultative anerobic degradation of organic matter.

Tests are available which simulate the more typical disposal situation for hazardous wastes such as foundry waste. These tests utilize a relatively unbuffered solution, e.g., deionized water, to provide a better simulation of leaching as it actually occurs in the environment. Examples of nonacidic or not heavily buffered acidic leach tests, commonly referred to as water leach tests, include the Indiana Water Leach Test, which is also called the EP Water Leach Test (Indiana Administrative Code Title 329, Article 2, Solid Waste Management Rule 9); the U.S. EPA Multiple Extraction Procedure (U.S. EPA, 1986, updated 1991, *Test Methods for Evaluating Solid Waste. Volume* 1C, Method 1320 EPA/530/SW-846); the Synthetic Precipitation Leaching Procedure (U.S. EPA 1986, updated 1991, Test Methods for Evaluating Solid Wastes. Method 1312, EPA/530/SW-846); the American Society of Testing Materials Test (ATSM Standards, method D3987-85); the American Foundryman's Society Leach Test (Ham, R. K., W. C. Boyle and T. P. Kunes, *J. Env. Eng. Div. Amer. Soc. Civil Eng.,* 107 EEL, pp. 155–170, 1981); and the University of Wisconsin SLT Test (Ham, R. K., M. A. Anderson, R. Stegmann and R. R. Stanforth, EPA 600/2-79/109, 1979).

For wastes that are not disposed of in acidic environments, two separate leach tests need to be run to determine whether the waste is hazardous according to regulatory standards, and to determine whether the waste could pose an actual environmental risk when exposed to nonacidic leachate in a disposal facility. The TCLP test will define the regulatory status of the waste. A water leach test will provide an indication of the actual leaching potential of the waste in the environment and indicate whether the Drinking Water Regulations (MCL's and SMCL's) are being exceeded.

U.S. Pat. Nos. 4,889,640 METHOD AND MIXTURE FOR TREATING HAZARDOUS WASTES; 4,950,409 METHOD FOR TREATING HAZARDOUS WASTES; and 5,037,479 METHOD FOR REDUCTION OF HEAVY METAL LEACHING FROM HAZARDOUS WASTE UNDER ACIDIC AND NON-ACIDIC CONDITIONS, are incorporated by reference herein and provide methods and mixtures for making wastes non-hazardous according to certain standards prior to deposit in a waste disposal site. Said patents disclose methods for chemically controlling the leaching process in waste.

U.S. Pat. No. 4,889,640 describes a method of treating solid hazardous waste containing unacceptable levels of leachable metals, such as lead and cadmium. It includes mixing the solid waste with an agent selected from the group consisting of reactive calcium carbonate, reactive magnesium carbonate, and reactive calcium magnesium carbonate. After the solid waste and agent are mixed under conditions which support reaction between the agent and metals, the metals will be converted into non-leachable forms which are relatively stable under normal environmental conditions. If the solid waste material and agent are both dry when mixed, it may be beneficial to add water to facilitate the mixing of the solid waste and agent and the conversion of the metals into non-leachable forms. The EP toxic wastes were treated and measured using the EP-toxicity test results to determine the amount of leaching of heavy metals after the treatment. The EP hazardous waste criteria was 1.0 mg per liter for cadmium and 5.0 mg per liter for lead.

U.S. Pat. No. 4,950,409 discloses a method of treating solid hazardous waste containing unacceptable levels of leachable metals such as lead and cadmium which includes mixing the solid waste with lime and an agent selected from the group of carbon dioxide and bicarbonate. After the solid waste and agent are mixed under conditions which support reaction between the agent and metals, the metals will be converted to non-leachable forms which are relatively stable under normal environmental conditions. If the solid waste and agent are both dry when mixed, it may be beneficial to add water to facilitate mixing of the solid waste and agent and conversion of the metals into non-leachable forms. The hazardous waste criterion for the EP toxicity test are 1.0 mg per liter cadmium and 5.0 mg per liter for lead.

U.S. Pat. No. 5,037,479 discloses a method of treating solid hazardous wastes containing unacceptable levels of leachable metals such as lead, cadmium and zinc which includes mixing the solid waste with a buffering agent selected from the group consisting of magnesium oxide, magnesium hydroxide, reactive calcium carbonate and reactive magnesium carbonate, and with an additional agent which is an acid or salt containing an anion that forms substantially non-leachable forms of the metals or is metallic iron that chemically reduces the metal to a non-leachable form. This anion agent is selected from the group consisting of triple superphosphate, phosphoric acid, or boric acid, so that under both acidic and non-acidic leaching conditions, the metals and mixture will be converted to substantially non-leachable forms. The criterion for the leachability uses the TCLP toxicity test whereby cadmium is extracted at a level below 1.0 mg per liter and lead is extracted at a level below 5.0 mg per liter, and also the water leach test whereby the criterion for cadmium is a level below 0.01 mg per liter and lead at a level below 0.05 mg per liter.

Common methods for treatment of contaminated waste sites usually involve excavating the contaminated material and treating it with a solidifying agent such as cement or some form of silicates. However, such treatment is costly and results in a large volume increase of the material. Such methods will sometimes employ a hollow-stem auger for injecting the cement or silicate material into the soil and then mixing in place. There is evidence to suggest, however, that such treatments are not always effective in preventing the leaching of heavy metals such as lead. (See *Immobilization Mechanisms n Solidification/Stabilization of Cd and Pb Salts Using Portland Cement Fixing Agents,* Cartledge, et al. Environ. Sci. Technol. 1990, Vol. 24, No. 6, pp. 867-873.)

Another known method of remediating heavy metal contaminated sites is to wash the affected soil or waste with a solution and collect the leachate for removal and disposal. This method has drawbacks of being lengthy and expensive, and resulting in a collection of concentrated heavy metals which may themselves be hazardous wastes which must be carefully disposed of.

Methods which involve excavation and removal of waste material for treatment are costly, requiring excavation and trucking equipment and personnel. Furthermore, due to strict regulations for handling and transport of hazardous wastes and soil contaminated with hazardous waste, even temporarily removing loads of soil for treatment above ground and on site may require specific permits or variances. For this reason, a treatment method which renders waste non-hazardous without any excavation is highly desirable.

What is needed is a method for treating waste sites containing heavy metals which chemically controls the leaching of heavy metals and which may economically be employed without the need for excavation of the site.

SUMMARY OF THE INVENTION

In accordance with the present invention, an in situ method is disclosed for in-place treatment of disposed wastes or soils containing unacceptable levels of leachable materials such as lead, zinc, arsenic, chromium, copper, or cadmium, which may or may not be hazardous under U.S. EPA criteria, which includes the steps of mixing or infiltrating or injecting the waste or soil with at least one additive that will chemically immobilize the metals such that they will not leach at unacceptable levels under naturally occurring conditions or in leaching tests, such as a water leach test, designed to simulate the environment. The treatment is accomplished by adding materials containing phosphates or carbonates of greater solubility than the heavy metal phosphates or carbonates to be formed. Where chromium is present as a heavy metal of concern, the additive is ferrous sulfate. The invention discloses the steps of introducing additives which immobilize the heavy metals by chemical reaction and precipitation in the soil or waste. The phosphate source is selected from the group consisting of sodium phosphate, sodium hydrogen phosphate, superphosphate, triple superphosphate, phosphoric acid, and polyphosphoric acid. The carbonate is selected from the group consisting of sodium carbonate, sodium bicarbonate, calcium carbonate, agricultural lime, and water softening sludge from municipal water softening plants. The phosphate- or carbonate-containing materials form insoluble phosphate or carbonate salts with the heavy metals in the soil or wastes such that the heavy metals will not leach out at unacceptable levels in the environment or in leaching tests such as a water leach test designed to simulate the environment. By "unacceptable" levels is meant levels of contaminants in excess of the MCL's and SMCL's as defined in the National Drinking Water Regulations. Where the addition of an additive may cause the release of a second toxic metal, an additional pH control agent additive may be added to immobilize both the toxic metals simultaneously. The pH control agent additive adjusts the pH of the leaching environment to the range where the heavy metal phosphate or carbonate salts are least soluble. The pH control agents are selected from the group consisting of magnesium hydroxide, magnesium oxide, calcium oxide, or calcium hydroxide. The additives may be introduced into the surface of the soil or disposed waste as a solid and mixed in by tilling when the soil/waste body is shallow, that is one to two feet deep. Where the waste body is deep, i.e. greater than two feet, the additive can be introduced as a solution or slurry by using an infiltration gallery, injection wells, an injection nozzle, or by the use of a hollow stem auger with in-place mechanical mixing. Preferably granular triple superphosphate and magnesium oxide powder are spread on the soil or waste, raked over the surface for uniform distribution and then tilled into the soil or waste. The amounts of triple superphosphate and magnesium oxide are in a sufficient quantity so that any 100 gram sample of the mixture has sufficient quantities of the additives to limit the heavy metal leaching to below the current Maximum Contaminant Levels (MCL) and the current secondary Maximum Contaminant Levels (SMCL) for drinking water as well as the levels which will be effective Jul. 30, 1992.

It is an object of the present invention to provide a simple and economical method of remediating soil and disposed waste which avoids excavation.

It is a further object of the present invention to provide a simple method of treating solid hazardous disposed wastes or soil in situ containing unacceptable levels of leachable heavy metals such as arsenic, lead, cadmium, chromium, copper, and zinc to reduce the leaching of said heavy metals and render the leachate within the primary and secondary Drinking Water Regulations criteria for those heavy metals.

It is also an object of the present invention to provide an effective treatment method where there are multiple heavy metals present by the simultaneous use of a pH control agent additive with the treatment additive to optimize the leaching environment to the pH range where the heavy metals are least soluble.

It is a further object of the present invention to provide a method for treating solid hazardous waste material containing unacceptable levels of leachable metals such as arsenic, lead, cadmium, chromium, copper, and zinc such that the treatment effectiveness does not decrease with the age of the treated waste.

Other objects, features and advantages of the invention will be apparent from the following detailed description of the invention.

DESCRIPTION OF THE PREFERRED EMBODIMENT

Figure 1:
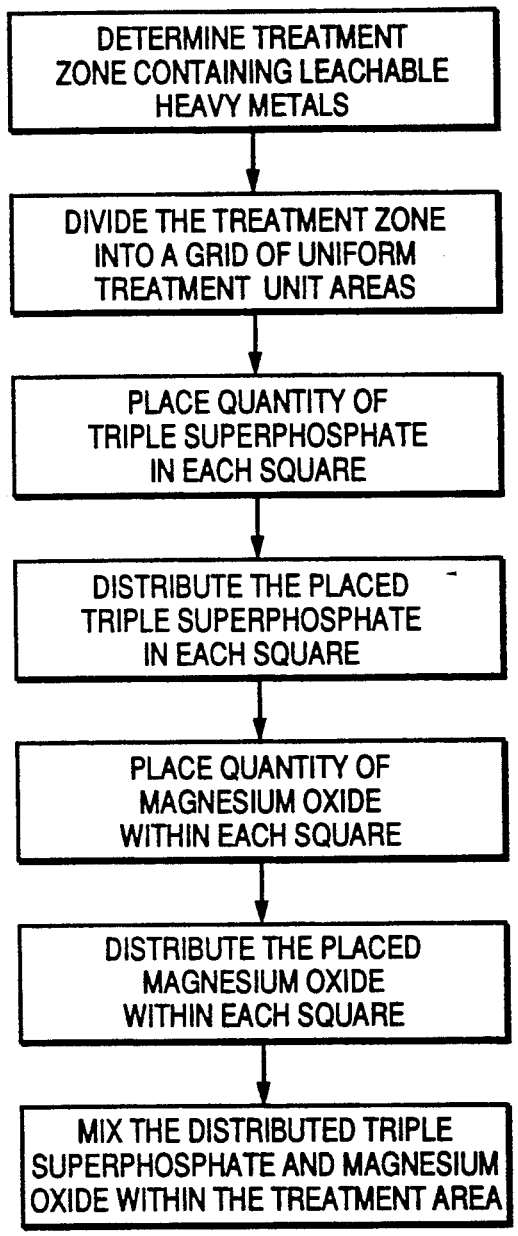
FIG. 1 is a flow chart indicating the steps a preferred embodiment of the soil or waste treatment method of this invention.

The present invention is an in situ method of treating solid hazardous waste to control leaching of arsenic, lead, cadmium, chromium, copper, and zinc in soil or disposed waste so as to chemically immobilize the heavy metals so that they will not leach at unacceptable levels under naturally occurring conditions. The untreated wastes or soils may or may not be hazardous under U.S. EPA criteria. The process consists of introducing a treatment additive consisting of a phosphate additive or carbonate additive or a chemical reducing additive such as a ferrous sulfate into the soil or waste. The treatment additive is then allowed to react with the soluble heavy metals in the soil to form insoluble phosphate or carbonate salts. Where chromium is present, the hexavalent soluble toxic chromium is reduced to the insoluble trivalent chromium form by the ferrous sulfate additive. A second additive, a pH control agent, may be used in addition to the phosphate or carbonate additive to adjust the pH of the leaching heavy metal environment to the range where the heavy metal phosphate or carbonate salts are the least soluble. In addition, the pH control agent may be used with the ferrous sulfate additive to buffer the solution to prevent trivalent chromium salts from solubilizing. The treatment additives are any of the following used individually or in combination: sodium phosphate, sodium hydrogen phosphate, superphosphate, triple superphosphate, phosphoric acid, polyphosphoric acid, sodium carbonate, sodium bicarbonate, calcium carbonate, agricultural lime, and water softening sludge from municipal water softening plants. The additives contain anions that precipitate the heavy metals into the soil or waste. Ferrous sulfate can be used to control chromium leaching. The pH controlling agent is selected from the group consisting of magnesium hydroxide, magnesium oxide, calcium oxide, and calcium hydroxide.

TABLE 1

| Additive | Used With Other Additives/ pH Control Agent |
| --- | --- |
| Sodium Phosphate | Alone |
| Sodium Hydrogen Phosphate | Alone |
| Superphosphate or Triple Superphosphate or Phosphoric Acid or Polyphosphoric Acid | Alone or with Sodium Carbonate Calcium Carbonate Magnesium Hydroxide Calcium Oxide or Calcium Hydroxide |
| Sodium Carbonate or Sodium Bicarbonate or Calcium Carbonate | Alone or with Superphosphate Triple Superphosphate Phosphoric Acid or Polyphosphoric Acid |
| Ferrous Sulfate (for hexavalent chromium) | Alone or with Magnesium Hydroxide, Magnesium Oxide, Calcium Oxide or Calcium Hydroxide |

Table 1 shows suggested combinations of additives and pH control agents, although other combinations are possible, depending upon specific heavy metals present in the contaminated soil or disposed waste. For a specific treatment, the appropriate ratio of additives and pH control agent (if needed) and disposed waste or soil may be arrived at by experimentation on 100 gram samples of the disposed waste or soil having various percentages of the additives and pH control agent (if needed) by weight. The appropriate ratio of additive and pH control agent (if needed) to disposed waste or soil should be selected so that the heavy metal levels are well below the MCL's and SMCL's of the EPA's National Primary and Secondary Drinking Water Regulations so that there is a margin of safety.

The mixing of the contaminated disposed solid waste and soil with the treatment additive and pH control agent additive (if necessary) must be complete enough so that any small sample of the treated contaminated waste or soil (e.g. 100 grams) has sufficient treatment additive and pH control agent additive (if necessary) to render it within the Drinking Water Regulations MCL's and SMCL's criteria when tested using a water leach test. The disposed waste or soil treatment additives and pH control agent additives (if needed) should be mixed into a mixture with a sufficient quantity of such that upon conversion of the metals into non-leachable forms, random 100 gram samples of the mixture will have sufficient agent to reduce the arsenic level to below 0.05 mg/L, the lead level to below 0.05 mg/L, the zinc level to below 5.0 mg/L, the cadmium level to below 0.005 mg/L, the copper level to below 1.0 mg/L and the chromium level to below 0.1 mg/L in the liquid extract which is prepared from the sample and analyzed in a water leach test.

In the preferred embodiment, solid waste which is classified as hazardous due to high levels of leachable lead and arsenic is treated with a combination of granular triple superphosphate (TSP) and magnesium oxide powder (MgO). The amount of additive and pH control agent will depend upon the concentrates of the heavy metal contaminants present. Thus a preliminary screening chemical analysis must be performed. After the analysis, a determination must be made of the effective quantity of additive and pH control agent. Dry mixing of the additive and pH control agent with the contaminated materials, i.e., disposed waste or soils, does not necessarily cause the reactions which convert the lead and arsenic into substantially non-leachable forms.

The term "non-leachable forms" as used herein means a form of arsenic, lead, zinc, cadmium, copper and chromium in the soil or disposed waste that, where subject to the leaching conditions of a water leach test, will not leach lead at above 0.05 mg/L in a water leach test leachate, or arsenic above 0.05 mg/L in a water leach test leachate or zinc above 5.0 mg/L in a water leach test leachate or cadmium above 0.005 mg/L in a water leach test leachate or copper above 1.0 mg/L in a water leach test leachate or chromium above 0.1 mg/L in a water leach test leachate. These leachate levels are based on the National Drinking Water Regulations current maximum contaminant levels (MCL's), secondary maximum contaminant levels (SMCL's), and revised MCL's for cadmium and chromium which will be effective Jul. 30, 1992, 40 CFR §141.11(b) (7-1-90 Ed), 40 CFR §143.3 (7-1-90 Ed) and 56 Fed. Reg. 3528 (1991 Table 1).

The reactions may not occur until the contaminated material is wetted naturally by rain or snow or until the mixture is analyzed using a leaching test. In appropriate amounts, the mixture of the first additive, and the second additive, the pH controlling agent, in solid waste will control the leaching of the metals under naturally occurring conditions.

An example of an application of the method of this invention is the treatment of a zone of soil contaminated with lead and arsenic as the result of the zone's use as an agricultural pesticide mixing area. Such a site, if left untreated, poses a potential hazard of contaminating ground water and hence drinking water from heavy metal leaching. This contamination is of a shallow depth, approximately one foot.

Because of the classification of the contaminated soil as hazardous, it may not be removed or disposed of without permitting or variances. By utilizing the method of this invention the contaminated soil is rendered non-hazardous. After treatment it may be left in place with no significant threat to ground water, or it may be excavated and disposed of in a conventional manner as non-hazardous waste.

As shown in the flow chart of FIG. 1, after analyzing the waste to determine appropriate amounts of additive required, the treatment zone — that is the area of ground that is determined to contain amounts of hazardous heavy metals requiring treatment — is divided into a grid of uniform contiguous squares. For a particular level of contamination a square of 11 square feet will be a workable size. Each square comprises an individual treatment unit area. The grid facilitates effective administration of necessary amounts of treatment additives by applicators with no specialized chemical skills. By dividing the treatment zone into discrete treatment unit areas, quality control is maintained by assuring that in treating the zone as a whole no portion of the contaminated ground is overlooked.

Once the appropriate quantity of additives per treatment unit area has been determined, the application of the treatment is a straight-forward process.

After the treatment zone has been determined and divided into treatment unit areas, an appropriate quantity of the first additive, for example a fifty-pound bag of triple superphosphate, is placed in each unit area. Once each unit area has received a bag of additive, complete coverage of the zone is easily determined visually.

One or more workers may then proceed to cut open and empty each bag within its own unit area. The triple superphosphate is then distributed uniformly within the unit area by raking it out to a constant depth over the unit area surface.

Next an appropriate quantity of the second additive, for example, a fifty-pound bag of magnesium oxide, is placed in each treatment unit area, cut open, and distributed by raking over the surface of each unit area.

Once the two additives are in place at appropriate levels over the entire zone, the additives are mixed into the contaminated soil throughout the zone.

The additives are applied in an appropriate mixture such that the additives, when mixed in the soil or waste, will control leaching of the metals using a water leach test method.

The soil and additives may be mixed by a conventional walk-behind type rotary tiller. However, a tractor-mounted rotary tiller is preferable to speed the mixing process and reduce operator contact with the soil and additives. The treatment zone may be sprayed with water if necessary to keep down dust.

After several passes with the rotary tiller, it will be necessary to draw core samples and to analyze the samples for treatment effectiveness.

The phosphate or carbonate containing materials form insoluble phosphate or carbonate salts with the heavy metal in the soil or wastes, such that heavy metals will not leach out at unacceptable levels in the environment or in leaching tests designed to simulate the environment. These tests might include water leaching tests or simulated acid rain leaching tests.

It should be noted that the additives may be applied and mixed with the soil or disposed waste in any conventional manner, with alternative means for maintaining quality control and overall coverage.

The addition of the additives as dry substances with surface mixing will be best utilized where the contaminated soil or waste to be remediated is located at relatively shallow depths, although use of specialized tilling machinery or harrows may allow depths of more than two feet to be treated.

For treatment of soils and wastes contaminated to depths greater than one to two feet, the additives should preferably be introduced as solutions or slurries. One method for introducing the additives is through injection wells, with collection and recycle of the leachate after it passes through the soil.

Alternatively, an additive solution may be introduced into the soil or waste through injection nozzles inserted into increasing depths of soil to facilitate contact between the soil or waste and the treatment additive solution. The injection nozzle may have a pointed end with perforations for easy insertion of the nozzle and discharge of the treatment additive into the soil. The additive solution is forced through varying depths of soil by inserting the nozzle to the desired depth and by application of pressure to the additive solution. One type of injector would be similar to a root zone irrigator commonly used to fertilize the root zone of trees.

Alternatively the solutions or slurries may be applied through an infiltration gallery which applies the solutions without disturbing the surface to allow the additives to percolate in solution into the soil or disposed waste where it precipitates at depth.

Another alternative in-place treatment may be carried out by injecting the treatment additive through the shaft of a hollow stem auger and then mixing the soil and additive with the auger.

TABLE 2
IMMOBILIZATION OF HEAVY METALS IN WATER LEACH TESTS BY ADDITION OF CARBONATE- OR PHOSPHATE-CONTAINING COMPOUNDS

| SAMPLE | EP WATER LEACH TEST RESULTS | | | |
|---|---|---|---|---|
| | pH | Arsenic mg/L | Lead mg/L | Zinc mg/L |
| *Waste 1 - treatment of a zinc containing waste* | | | | |
| Untreated | 6.35 | NA | NA | 570 |
| +5% Sodium Carbonate | 8.85 | | | 0.4 |
| +10% Sodium Carbonate | 10.25 | | | 0.5 |
| *Waste 2 - treatment of a steel mill waste* | | | | |
| Untreated | 11.65 | NA | 16.0 | 1.7 |
| +5% TSP** | 9.45 | NA | 0.016 | 0.06 |
| +10% TSP | 6.54 | NA | 0.008 | 0.27 |
| *Waste 3 - treatment of a soil contaminated with lead and arsenic* | | | | |
| Untreated | 7.87 | 0.012 | 1.4 | NA |
| +5% TSP | 5.45 | 0.37 | 0.110 | NA |
| +10% TSP | 5.04 | 0.50 | 0.067 | NA |
| +5% TSP & 5% MgO | 10.2 | 0.004 | 0.027 | NA |
| Drinking Water Criteria (MCL or SMCL) | — | 0.05 | 0.05 | 5 |

| | pH | Cadmium mg/L | Copper mg/L | Lead mg/L | Zinc mg/L |
|---|---|---|---|---|---|
| *Waste 4 - Treatment of an iron foundry waste* | | | | | |
| Untreated | 3.55 | 0.090 | 2.5 | 0.048 | 21 |
| +5% TSP & 10% MgO | 10.43 | .001 | 0.01 | 0.004 | 0.05 |
| Drinking Water Criteria (MCL or SMCL) | — | 0.005 | 1 | 0.05 | 5 |

| | pH | Chromium mg/L |
|---|---|---|
| *Waste 5 - Treatment of chromium-containing waste* | | |
| Untreated | 12.73 | 8.75 |
| +2.75% FeSO4 | 12.72 | 3.50 |
| +5.0% FeSO4 | 12.68 | 0.005 |
| +10% FeSO4 | 12.62 | 0.005 |
| Drinking Water Criteria (MCL) | | 0.1 |

*NA = not analyzed
**TSP = triple superphosphate

Five examples of laboratory waste treatment of soil samples and disposed wastes containing heavy metal with specific additives are given in Table 2. By way of example, untreated waste shown in Table 2 contains concentrations of leachable zinc which exceed SMCL's for drinking water. If the 100 gram sample is a mixture containing 5% sodium carbonate by weight, the level of zinc in the EP Water Leach test leachate is reduced from 570 mg/L to 0.4 mg/L, a drastic reduction and well below the SMCL for zinc of 5.0 mg/L. Addition of sodium carbonate materials reduced zinc leaching to below the water criteria for zinc of 5.0 milligrams per liter. Such treatment is used to immobilize zinc in the waste such that zinc does not leach out into the surrounding environment.

In the second example, Waste 2, a steel mill waste was treated with triple superphosphate. If the 100 gram sample is a mixture containing 5% TSP by weight, the level of the lead in the EP Water Leach test extract is reduced from 16.0 mg/L to 0.016 mg/L and the level of zinc in the EP Water Leach test extract is reduced from 1.7 mg/L to 0.06 mg/L. The treatment reduced the leaching to well below the Primary Drinking Water Regulation standards (MCL) for lead of 0.05 milligrams per liter. In addition, the phosphate lowered the pH of the leaching solution from 11.65 to more acceptable values of pH.

In the third example, Waste 3, a soil contaminated with lead and arsenic was treated with TSP and then with a mixture of TSP and magnesium oxide. If the 100 gram sample is a mixture containing 5% TSP by weight, the level of lead in the EP Water Leach test liquid extract is reduced from 1.4 mg/L to 0.11 mg/L. This however caused an increase in the level of arsenic in the EP Water Leach test liquid extract from 0.012 mg/L in the untreated soil to 0.370 mg/L in the treated soil. Treatment with TSP alone, although decreasing the leachable lead concentration, caused an increase in the leachable arsenic concentration. The pH controlling agent, magnesium oxide, was introduced to immobilize both the lead and arsenic simultaneously. Once the 5 percent TSP and 5 percent magnesium oxide were added, the leaching of arsenic was reduced to well below the Drinking Water Regulation Standards (MCL/SMCL's) of 0.05 milligrams per liter for arsenic and 0.05 milligrams per liter for lead.

The fourth example, Waste 4, illustrates the treatment of an iron foundry waste containing cadmium, copper, lead, and zinc to which 5% TSP and 10% magnesium oxide were added. If the 100 gram sample is a mixture containing 5% TSP by weight and 10% MgO by weight, the level of cadmium in the EP Water Leach test liquid extract is reduced to well below the Drinking Water Regulations criterion of 0.005 milligrams per liter, the copper level is reduced to well below the drinking water criteria of 1.0 milligrams per liter, the lead level is reduced to well below the Drinking Water Regulations criteria of 0.05 milligrams per liter, and the zinc level is reduced to well below the Drinking Water Regulations 5.0 milligrams per liter.

The fifth example, Waste 5, shows the treatment of a chromium containing waste with the additive ferrous sulphate. In this instance where the 100 gram sample of the waste contains 10% by weight of ferrous sulphate, leaching of chromium is reduced to well below the Drinking Water Regulations criteria (MCL) for chromium of 0.100 milligrams per liter using the EP Water Leach test.

It is expected that in situ treatment of the waste will result in similar reductions of leachable concentrations of the heavy metals. It is expected that use of these additives in dry forms, solutions or slurries should all be effective.

It should be noted that in some cases soil or disposed wastes containing heavy metals in quantities less than those deemed hazardous by the U.S. EPA will still be desirably remediated by the process of this invention due to potential hazards to nearby ground water. In those cases the process will be advantageously applied primarily for its simplicity and low cost.

It is understood that the invention is not confined to the particular process disclosed herein, nor to the materials and substances described, but embraces such modified forms thereof as come within the scope of the following claims.

We claim:

1. A method for treating disposed solid waste or soils containing unacceptable levels of chromium, the method comprising the step of mixing the solid disposed waste or soil with ferrous sulfate, so that under conditions which support the reaction between the ferrous sulfate and the chromium, the chromium will be converted to non-leachable forms which are stable under normal environmental conditions.

2. The method specified in claim 1 wherein the disposed waste or soils and ferrous sulfate are mixed into a mixture with a sufficient quantity of the ferrous sulfate such that upon conversion of the chromium into non-leachable form, random 100 gram samples of the mixture will have sufficient ferrous sulfate to reduce the chromium level to below 0.1 milligrams per liter in a liquid extract which is prepared from the sample and analyzed in accord with a water leach test.

3. The method of claim 1 wherein the ferrous sulfate is mixed with the soil or waste by introducing a solution of ferrous sulfate into the top of the soil.

4. The method specified in claim 1 wherein the ferrous sulfate is mixed with the soil or waste is by introducing a solution of the ferrous sulfate through an injection nozzle, forcing the ferrous sulfate through various depths of a soil or waste by inserting the nozzle to the desired depth within the soil or waste and by application of pressure to the ferrous sulfate solution.

5. The method of claim 1 further comprising adding a pH control agent to the soil or waste in which the ferrous sulfate has been introduced, the pH control agent being selected from the group consisting of magnesium oxide, magnesium hydroxide, calcium oxide and calcium hydroxide.

6. A method of treating soil or disposed solid waste containing unacceptable levels of leachable copper comprising the step of mixing the solid waste or soil with an additive selected from the group consisting of sodium phosphate, sodium hydrogen phosphate, superphosphate, triple superphosphate, phosphoric acid, polyphosphoric acid, sodium carbonate, sodium bicarbonate, and calcium carbonate, so that under conditions which support reaction between the additive and the copper, the copper will be converted to non-leachable forms which are stable under normal environmental conditions.

7. The method of claim 6 further comprising introducing into the soil or waste a second additive for pH control selected from the group consisting of magnesium hydroxide, magnesium oxide, calcium oxide and calcium hydroxide along with the first additive.

8. The method of claim 6 wherein the soil or disposed waste and the additive are mixed in a mixture with a sufficient quantity of the additive such that upon conversion of the copper into non-leachable forms, random 100 gram samples of the mixture will have a sufficient additive to reduce the copper level below 1.0 milligrams per liter in a liquid extract which is prepared from the sample and analyzed in accord with a water leach test.

9. A method of treating soil or disposed solid waste containing unacceptable level of leachable arsenic, comprising mixing the soil or waste with at least one additive selected from the group consisting of superphosphate, triple superphosphate, phosphoric acid, polyphosphoric acid, and with at least one pH control agent additive selected from the group consisting of magnesium oxide, magnesium hydroxide, calcium oxide and calcium hydroxide, so that under conditions which will support the reaction between the additives and the arsenic, the arsenic will be converted to non-leachable forms which are stable under normal environmental conditions.

10. The method of claim 9 wherein the soil or disposed waste and pH control agent are mixed into the mixture with a sufficient quantity of additives such that upon conversion of the arsenic into non-leachable forms, random 100 gram samples of the mixture will have sufficient additives to reduce the arsenic levels to less than 0.05 milligrams per liter in a liquid extract which is prepared from the sample and analyzed in accord with a water leach test.

11. A process for reducing the leaching of copper from disposed waste or contaminated soil, in a particular treatment zone, comprising:
(a) dividing the treatment zone into a grid of treatment unit areas;
(b) placing a predetermined quantity of a first additive selected from the group consisting of sodium phosphate, sodium hydrogen phosphate, superphosphate, triple superphosphate, phosphoric acid, and polyphosphoric acid;
(c) distributing each quantity of first additive over each treatment unit area;
(d) mixing the first additive with the soil or waste of each treatment unit area whereby under environmental leaching conditions the copper in the soil or disposed waste will be converted into substantially non-leachable forms.

12. The process of claim 11 further comprising:
(a) placing a prescribed quantity of a second additive selected from the group consisting of magnesium hydroxide, magnesium oxide, calcium oxide, and calcium hydroxide within each unit area;
(b) mixing the first and second additives with the soil or waste of each of the treatment unit areas.

13. A process for reducing the leaching of arsenic from disposed waste or contaminated soil, in a particular treatment zone, comprising:
(a) dividing the treatment zone into a grid of treatment unit areas;
(b) placing a predetermined quantity of a first additive selected from the group consisting of sodium phosphate, sodium hydrogen phosphate, superphosphate, triple superphosphate, phosphoric acid, and polyphosphoric acid;
(c) distributing each quantity of first additive over each treatment unit area;
(d) mixing the first additive with the soil or waste of each treatment unit area;
(e) placing a prescribed quantity of a second additive selected from the group consisting of magnesium hydroxide, magnesium oxide, caclium oxide, and calcium hydroxide within each unit area;
(f) mixing the first and second additives with the soil or waste of each of the treatment unit areas, whereby under environmental leaching conditions the arsenic in the soil or disposed wastes will be converted into substantially non-leachable forms.

* * * * *